United States Patent
Fujimoto

(10) Patent No.: US 10,427,049 B2
(45) Date of Patent: Oct. 1, 2019

(54) GAME SYSTEM AND GAME APPARATUS

(75) Inventor: Noriyoshi Fujimoto, Tokyo (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 459 days.

(21) Appl. No.: 13/356,959

(22) Filed: Jan. 24, 2012

(65) Prior Publication Data

US 2012/0190457 A1     Jul. 26, 2012

(30) Foreign Application Priority Data

Jan. 26, 2011    (JP) ................. 2011-014485

(51) Int. Cl.
| A63F 13/30 | (2014.01) |
| A63F 13/77 | (2014.01) |
| A63F 13/92 | (2014.01) |
| A63F 13/31 | (2014.01) |

(52) U.S. Cl.
CPC .............. *A63F 13/77* (2014.09); *A63F 13/31* (2014.09); *A63F 13/92* (2014.09); *A63F 2300/405* (2013.01); *A63F 2300/408* (2013.01); *A63F 2300/552* (2013.01); *A63F 2300/575* (2013.01); *A63F 2300/609* (2013.01)

(58) Field of Classification Search
CPC .......................... A63F 2300/405; A63F 13/12; G06Q 30/0209
USPC ......................................................... 463/31
See application file for complete search history.

(56) References Cited

U.S. PATENT DOCUMENTS

| 6,482,092 B1 | 11/2002 | Tajiri et al. | |
| 2005/0130112 A1* | 6/2005 | Lotvin et al. | 434/323 |
| 2005/0197187 A1* | 9/2005 | Mitsuyoshi et al. | 463/31 |
| 2006/0094499 A1* | 5/2006 | Amemiya et al. | 463/29 |
| 2006/0252512 A1* | 11/2006 | Walker et al. | 463/25 |
| 2008/0113809 A1* | 5/2008 | David | G07F 17/32 463/42 |

(Continued)

FOREIGN PATENT DOCUMENTS

| EP | 2133127 | | 12/2009 |
| GB | 2424842 A | * | 10/2006 |
| JP | 2001-129240 | | 5/2001 |

OTHER PUBLICATIONS

Matthias Hasel, "Rich Internet Architectures for Browser-Based Multiplayer Real-Time Games—Design and Implementation Issues of virtual kicker.com", Network-based information systems: first international conference, NBiS 2007, XP002698759, URL:http://rd.springer.com/content/pdf/10.1007%2F978-3-540-74573-0_17.pdf, Sep. 7, 2007, pp. 157,158,163.

(Continued)

*Primary Examiner* — James S. McClellan
*Assistant Examiner* — Syvila Weatherford
(74) *Attorney, Agent, or Firm* — Greenblum & Bernstein, P.L.C.

(57) ABSTRACT

A communication play is performed between a master machine and a slave machine. The slave machine can obtain an item according to the result of the communication play and the item is deposited to the master machine. After the communication play ends, if a cartridge is mounted to the slave machine and the master machine and the slave machine perform communication, the item that has been deposited to the master machine is delivered to the slave machine.

20 Claims, 7 Drawing Sheets

(56) References Cited

U.S. PATENT DOCUMENTS

| | | | | |
|---|---|---|---|---|
| 2008/0254854 A1* | 10/2008 | Slomiany | ............... | G07F 17/32 |
| | | | | 463/19 |
| 2010/0075759 A1 | 3/2010 | Kawabata | | |
| 2010/0167814 A1* | 7/2010 | Kim | ............ | G06Q 20/12 |
| | | | | 463/25 |
| 2010/0184515 A1* | 7/2010 | Takahashi | .............. | A63F 13/10 |
| | | | | 463/42 |
| 2011/0081964 A1* | 4/2011 | Acres | ............................ | 463/30 |
| 2011/0112895 A1* | 5/2011 | Snyder | ..................... | 705/14.12 |

OTHER PUBLICATIONS

VK-Team, "Neues Trophaen-System", Virtual Kicker League, XP002698760, URL:http://www.virtual-kicker.de/index.php?id=11&article=30, Sep. 30, 2006.

"Spielregeln", Virtual Kicker League, XP002698761, URL:http://web.archive.org/web/20110101063438/http://www.virtual-kicker.de/index.php?id=34, Jan. 1, 2011.

Search report from E.P.O., dated Jul. 4, 2013.

Communication Pursuant to Article 94(3) EPC from European Patent Office (EPO) in European Patent Appl. No. 12152528.1, dated Mar. 13, 2017.

\* cited by examiner

FIG. 6

| MAC ADDRESS | POSSESSOR NAME | FIELD MAP ID | EVENT MAP ID | ENEMY CHARACTER ID | ITEM ID |
|---|---|---|---|---|---|
| 25:68:3C:4E:B7:08 | SAKAMOTO RYOMA | ID100 | ID200 | ID300 | ID400 |

Master machine 1a

Slave machine 1b

Master machine 1a

Slave machine 1b

Master machine 1a

Slave machine 1b

GAME SYSTEM AND GAME APPARATUS

CROSS REFERENCE TO RELATED APPLICATION

The present disclosure relates to subject matter contained in Japanese Patent Application No. 2011-014485 field on Jan. 26, 2011, the disclosure of which is expressly incorporated herein by reference in its entirety.

BACKGROUND OF THE INVENTION

1. Field of the Invention

The present invention relates to a game apparatus and a game system in which a player who operates a game apparatus without having a game program can obtain the same benefit such as an item which has originally obtained in a communication play. This is done when the game apparatus which does not have the game program downloads a part of the game program from a game apparatus which has the game program and performs the communication play with the game apparatus having the game program.

2. Description of the Related Art

In the related art, players who have the same game software may perform communication between game apparatuses, match or cooperate with each other, and implement a game. Even when the players do not have the same game software, a download play is performed where a mini game of a part of the game is downloaded to the game apparatuses possessed by the other user and a communication play is performed between the user possessing the game software and the user not possessing the game software.

However, when the player who does not have the game software performs the communication play, the download program does not remain in the game apparatus, after the communication play ends. For this reason, a benefit such as an item that has been originally obtained in the communication play cannot be obtained and pleasure is limited at that time.

For example, Japanese Patent Application Laid-Open (JP-A) No. 2001-129240 discloses a game system in which a game play can be enjoyed during a long period of time by presenting assistance data such as an item useful for the implementation of a game to their friends' game apparatus and the players rarely tire of the game play.

However, according to a method that is disclosed in JP-A No. 2001-129240, even though the assistance data is presented when communication is performed, the benefit that can be originally obtained through the communication play cannot be obtained after the download play is performed.

SUMMARY OF THE INVENTION

It is an object of the present invention to provide a game apparatus and a game system in which a player who operates a game apparatus without having a game program can obtain the same benefit such as an item which is originally obtained through a communication play, when the game apparatus which does not have the game program downloads a part of the game program from a game apparatus which has the game program and performs the communication play with the game apparatus having the game program.

According to a first aspect of the present invention, there is provided a game system that comprises at least two or more game apparatuses performing communication with each other, wherein a first game apparatus comprises a game program storage that stores a game program including a communication play program to perform a communication play with a second game apparatus, a communication play program transmitter that transmits the communication play program stored in the game program storage to the second game apparatus, a first identification information receiver that receives identification information from the second game apparatus to specify the second game apparatus, a first game implementor that implements a game while performing communication with the second game apparatus, according to the communication play program, a benefit information storage that associates benefit information to offer a benefit in implementing the game in the second game apparatus with the identification information of the second game apparatus received by the first identification information receiver and stores the benefit information and the identification information, according to the implementation result of the game by the first game implementor, a second identification information receiver that receives the identification information from the second game apparatus, when communication with the second game apparatus is established again after the communication play ends, and a benefit information transmitter that transmits the benefit information stored in the benefit information storage and corresponding to the identification information received by the second identification information receiver, to the second game apparatus, and wherein the second game apparatus comprises a first identification information transmitter that transmits the identification information of the second game apparatus to the first game apparatus, a communication play program receiver that receives the communication play program from the first game apparatus, a communication play program storage that temporarily stores the communication play program received by the communication play program receiver until a communication play with the first game apparatus ends, a second game implementor that implements the game while performing communication with the first game apparatus, according to the communication play program stored in the communication play program storage, a second identification information transmitter that transmits the identification information to the first game apparatus, when communication with the first game apparatus is established again after the communication play ends, a benefit information receiver that receives the benefit information from the first game apparatus, and a benefit offerer that offers a benefit in implementing the game in the second game apparatus, according to the benefit information received by the benefit information receiver.

Preferably, according to the first aspect of the present invention, the second game apparatus does not comprise the game program storage that stores the game program when the communication play is performed and the benefit is offered by the benefit offerer in the second game apparatus under a condition that the second game apparatus comprises the game program storage.

In the present invention, the communication play program executes the communication play by transmitting the game software from the first game apparatus to the second game apparatus, so that the first game apparatus where the game program is stored (for example, game apparatus where the game software is mounted) and the second game apparatus where the game program is not stored (for example, game apparatus where the game software is not mounted) can perform the communication play. The second game apparatus can download the communication play program and can perform the communicate play with the first game apparatus. When the communication play ends, the program that is downloaded to the second game apparatus is erased.

Then, if the game software is installed to the second game apparatus, the benefit such as the item that can be originally obtained through the communication play can be obtained at that time. By this configuration, if the benefit obtained through the communication play can be obtained with respect to the player of the second game apparatus, it is strongly motivated to perform a trial communication play or purchase game software. The benefit that cannot be normally obtained at the time of performing the download play can be obtained and the entertainment potential of the game can be improved.

According to a second aspect of the present invention, there is provided a game apparatus that performs communication with another game apparatus, the game apparatus comprising: a game program storage that stores a game program including a communication play program to perform a communication play with another game apparatus; a communication play program transmitter that transmits the communication play program stored in the game program storage to another game apparatus; a first identification information receiver that receives identification information from another game apparatus to specify another game apparatus; a game implementor that implements a game while performing communication with another game apparatus, according to the communication play program; a benefit information storage that associates benefit information to offer a benefit in implementing the game in another game apparatus with the identification information of another game apparatus received by the first identification information receiver and stores the benefit information and the identification information, according to the implementation result of the game by the game implementor; a second identification information receiver that receives the identification information from another game apparatus, when communication with another game apparatus is established again after the communication play ends; and a benefit information transmitter that transmits the benefit information stored in the benefit information storage and corresponding to the identification information received by the second identification information receiver, to another game apparatus.

According to a third aspect of the present invention, there is provided a tangible computer readable medium that stores a game program that comprises a communication play program to perform a communication play with another game apparatus and executes a game in a computer device, the game program causing the computer device to function as: a communication play program transmitter that transmits the communication play program to another game apparatus; a first identification information receiver that receives identification information from another game apparatus to specify another game apparatus; a game implementor that implements a game while performing communication with another game apparatus, according to the communication play program; a benefit information storage that associates benefit information to offer a benefit in implementing the game in another game apparatus with the identification information of another game apparatus received by the first identification information receiver and stores the benefit information and the identification information, according to the implementation result of the game by the game implementor; a second identification information receiver that receives the identification information from another game apparatus, when communication with another game apparatus is established again after the communication play ends; and a benefit information transmitter that transmits the benefit information stored in the benefit information storage and corresponding to the identification information received by the second identification information receiver, to another game apparatus.

According to a fourth aspect of the present invention, there is provided a game apparatus that performs communication with another game apparatus, the game apparatus comprising: a first identification information transmitter that transmits identification information of the game apparatus to another game apparatus; a communication play program receiver that receives a communication play program from another game apparatus to perform a communication play with another game apparatus; a communication play program storage that temporarily stores the communication play program received by the communication play program receiver until the communication play with another game apparatus ends; a game implementor that implements a game while performing communication with another game apparatus, according to the communication play program stored in the communication play program storage; a second identification information transmitter that transmits the identification information to another game apparatus, when communication with another game apparatus is established again after the communication play ends; a benefit information receiver that receives benefit information from another game apparatus to offer a benefit in implementing the game; and a benefit offerer that offers the benefit in implementing the game in the second game apparatus, according to the benefit information received by the benefit information receiver.

According to a fifth aspect of the present invention, there is provided a game system that comprises a portable game apparatus and a game server performing communication with the portable game apparatus through an access point, wherein the game server comprises a game program storage that stores a game program to play a game in the portable game apparatus, a game program transmitter that transmits the game program stored in the game program storage to the portable game apparatus, a first identification information receiver that receives identification information from the portable game apparatus to specify the portable game apparatus, a game result receiver that receives the implementation result of the game by the portable game apparatus, a benefit information storage that associates benefit information to offer a benefit in implementing the game in the portable game apparatus with the identification information of the portable game apparatus received by the first identification information receiver and stores the benefit information and the identification information, according to the implementation result of the game received by the game result receiver, a second identification information receiver that receives the identification information from the portable game apparatus, when communication with the portable game apparatus is established again after the communication with the portable game apparatus ends, and a benefit information transmitter that transmits the benefit information stored in the benefit information storage and corresponding to the identification information received by the second identification information receiver, to the portable game apparatus, and wherein the portable game apparatus comprises a first identification information transmitter that transmits the identification information of the portable game apparatus to the game server, a game program receiver that receives the game program from the game server, a game program storage that temporarily stores the game program received by the game program receiver until communication with the game server ends, a game implementor that implements the game while performing communication with the game server, according to the game program stored in the game program storage, a second identification information transmitter that transmits the identification information to the game server, when communication with the game server is established again after the communication with the game server ends, a benefit information receiver that receives the benefit information from the game server, and a benefit offerer that offers a benefit in implementing the game in the portable game apparatus, according to the benefit information received by the benefit information receiver.

Preferably, according to the fifth aspect of the present invention, the portable game apparatus does not comprise the game program storage that stores the game program when first communication with the game server is performed and the benefit is offered by the benefit offerer in the second game apparatus under a condition that the portable game apparatus comprises the game program storage.

In stores such as an electric merchandising store or a game software store, a game program is downloaded from a game server to a game apparatus through an access point, so that a player performs a trial play of a game. However, if the game ends, the benefit that was originally obtained by the result of the game does not remain as data and is effective only at that time. According to the present invention, after the player performs the trial play, if the player purchases the game software and performs communication with the game server again, the benefit that should have been obtained when the trial play was performed can be obtained. Therefore, it is strongly motivated to purchase the game software. The benefit that cannot be normally obtained at the time of the download play can be obtained and the entertainment potential of the game can be improved.

BRIEF DESCRIPTION OF THE DRAWINGS

FIG. 6 is a diagram illustrating a benefit information table according to the embodiment of the present invention.

DETAILED DESCRIPTION OF THE EMBODIMENTS

Figure 1:
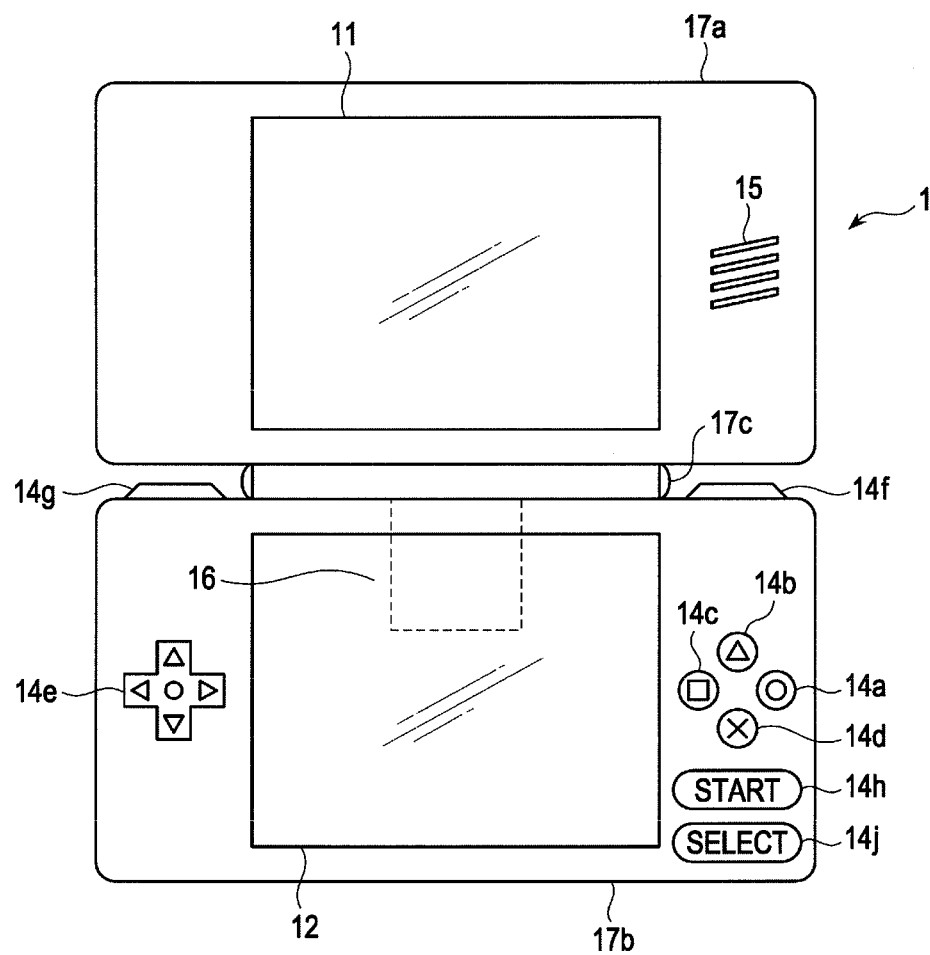
FIG. 1 is an appearance diagram of a game apparatus according to an embodiment of the present invention.

An embodiment of the present invention will be described with reference to the accompanying drawings. FIG. 1 is an appearance diagram illustrating the configuration of a game apparatus that is applied to the embodiment. A portable game apparatus 1 stores a first display 11 in an upper housing 17a and stores a second display 12 in a lower housing 17b. A hinge part 17c is provided in a lower side of the upper housing 17a and is connected to an upper side of the lower housing 17b, so that an opening/closing operation can be freely made. In the right side of the first display 11 of the upper housing 17a, a sound hole of a speaker 15 is formed.

An operation part 14 includes a ○ button 14a, a Δ button 14b, a □ button 14c, and a x button 14d which are operation switches, a cross key 14c which is a direction instruction switch, a start button 14h, a select button 14j, and L button 14g and an R button 14f which are side surface switches. The ○ button 14a, the Δ button 14b, the □ button 14c, and the x button 14d are disposed on the right side of the second display 12 in the lower housing 17b. The cross key 14e is disposed on the left side of the second display 12 in the lower housing 17b. The L button 14f and the R button 14g are disposed on the left end and the right end of the upper side in the lower housing 17b and are used for inputting a predetermined instruction if necessary. Although not illustrated in FIG. 1, a touch panel is provided on a top surface of the second display 12. The touch panel detects the position coordinates of a stick or a finger when it presses or moving on the touch panel.

In the side surface on the upper side of the lower housing 17b, a cartridge insertion part is provided to insert a cartridge 16 which is a storage medium for storing a game program. A connector 28 to make a connection with the cartridge 16 is built inside the cartridge insertion part.

Figure 2:
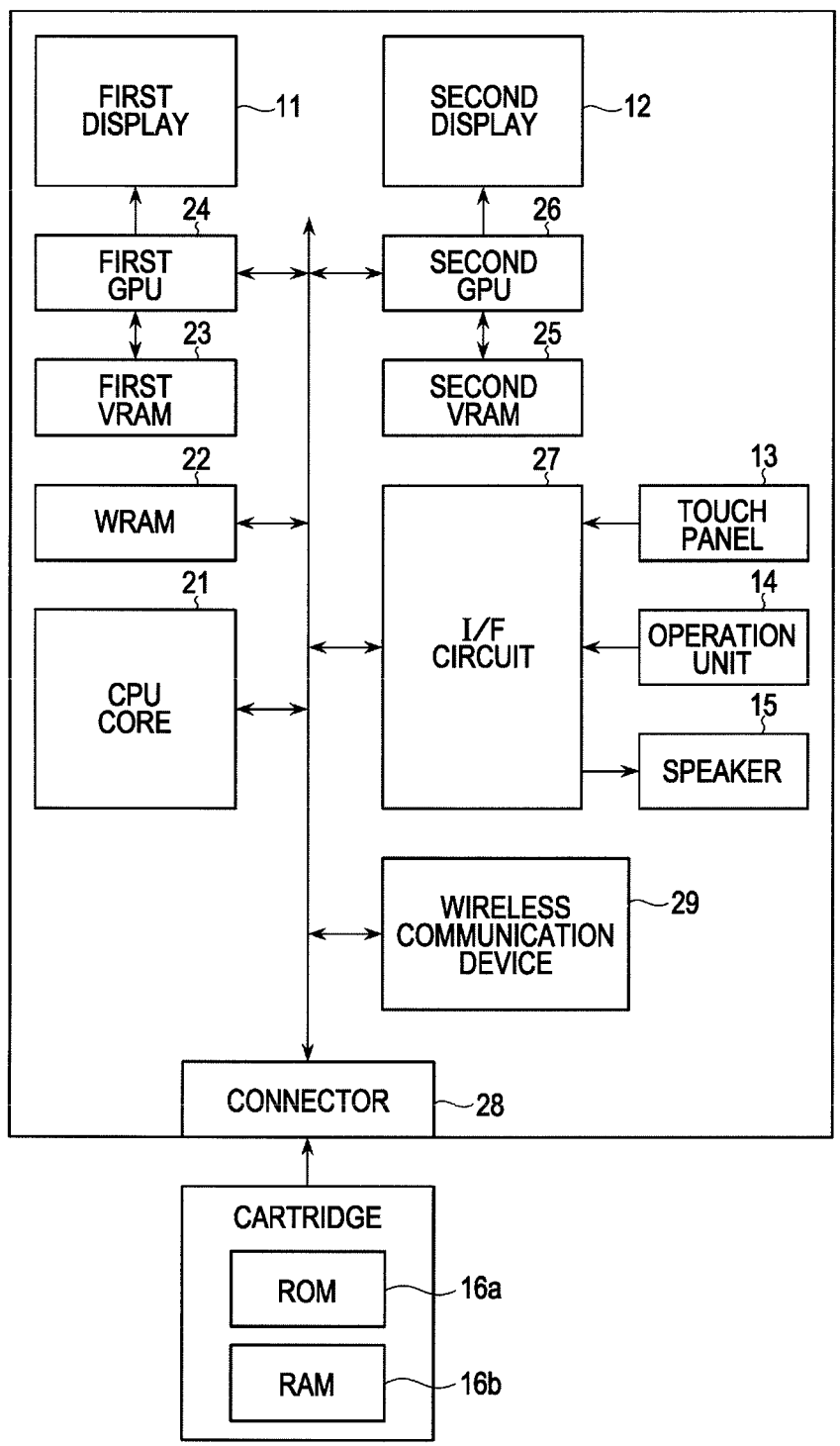
FIG. 2 is a block diagram illustrating the configuration of the game apparatus according to the embodiment of the present invention.

Next, the circuit configuration of the game apparatus 1 will be described. FIG. 2 is a block diagram illustrating the configuration of the game apparatus 1. On an electronic circuit board that is stored in the housing 17, a CPU core 21 is mounted. The CPU core 21 is connected to a working RAM (WRAM) 22, a first graphic processing unit (first GPU) 24, a second graphic processing unit (second GPU) 26, an input/output interface (I/F) circuit 27, and the connector 28. The CPU core 21 can be connected to the cartridge 16 through the connector 28. The CPU core 21 includes a ROM where a system program is stored and an internal timer. The I/F circuit 27 is a circuit that transmits and receives data between the CPU core 21 and an external input/output device such as the touch panel 13, the operation part 14, and the speaker 15.

The cartridge 16 is a storage medium where the game program is stored and mounts a ROM 16a where the game program is stored and a RAM 16b where backup data can be rewritten. The game program that is stored in the ROM 16a of the cartridge 16 is loaded to the WRAM 22 and the loaded game program is executed by the CPU core 21. Temporary data that is obtained by executing the game program by the CPU core 21 or data to generate an image is stored in the WRAM 22.

The first GPU 24 (hereinafter, referred to as a "first VRAM") and the second GPU 26 (hereinafter, referred to as a "second VRAM") generate a game image based on the data stored in the WRAM 22, in a unit of frame (for example, a unit of 1/30 sec.), according to an instruction from the CPU core 21, and draw the game image in the first VRAM 23 and the second VRAM 25. The first GPU 24 and the second GPU 26 display the game images drawn in the first VRAM 23 and the second VRAM 25 in the first display 11 and the second display 12, respectively, according to an instruction from the CPU core 21.

The wireless communication device 29 is connected to a communication network through a wireless communication port and can perform communication with another game apparatus or a server device through the Internet. The wireless communication device 29 can perform wireless communication with another game apparatus or the server device, through a communication unit having an antenna.

Figure 3A:
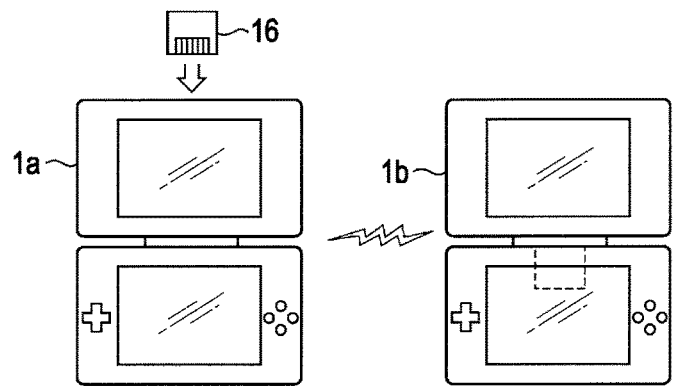
FIGS. 3A to 3C are diagrams illustrating the outline of a game system according to the embodiment of the present invention.
Figure 3B:
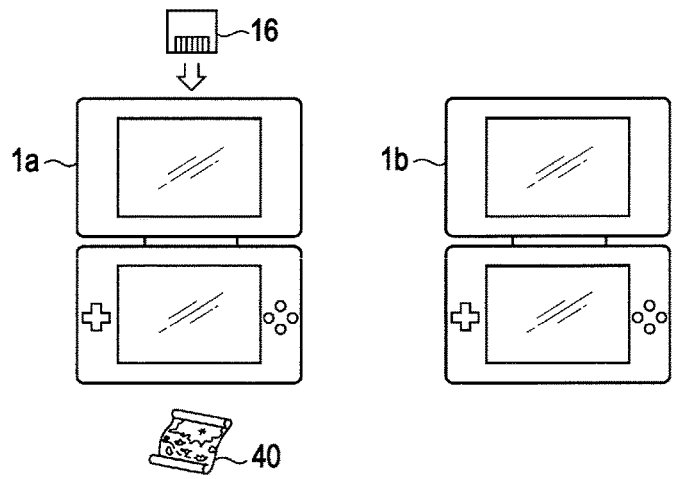
Figure 3C:
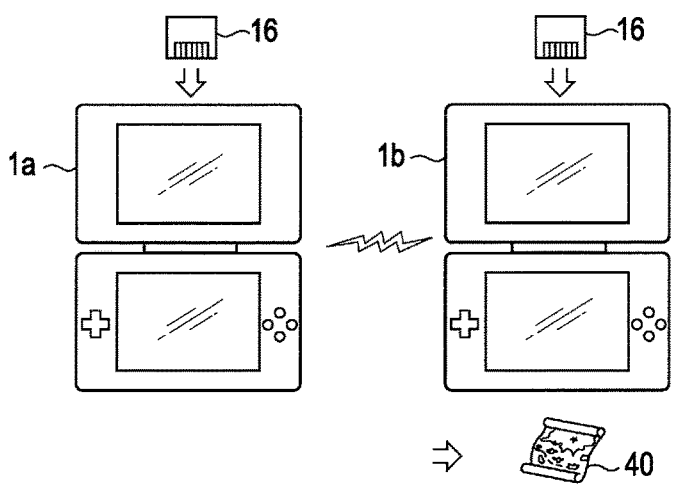

Next, the game system according to the embodiment of the present invention will be described. FIGS. 3A to 3C are diagrams illustrating the outline of the game system according to the embodiment of the present invention. In this invention, when the communication play is being performed, it is assumed that a game apparatus mounting the cartridge 16 in which the game program is stored is referred to as a first game apparatus 1a (hereinafter, referred to as a master machine) and a game apparatus mounting no cartridge 16 in which the game program is stored is referred to as a second game apparatus 1b (hereinafter, referred to as a slave machine). In FIGS. 3A to 3C, the number of each of the master machines 1a and the slave machines 1b is one. However, a plurality of the slave machines 1b may be present with respect to one master machine 1a.

First, as illustrated in FIG. 3A, the master machine 1a where the cartridge 16 is mounted and the slave machine 1b where the cartridge 16 is not mounted perform the communication play. Among the game programs that are stored in the ROM 16a of the cartridge 16, the game program (communication play program) that is needed to execute the communication play is downloaded to the WRAM 22 of the slave machine 1b. When the communication play ends, the slave machine 1b can obtain an item 40, according to the result of the communication play. However, when the communication play ends, a communication play program of the slave machine 1b is erased from the WRAM 22. For this reason, as illustrated in FIG. 3B, the item 40 is deposited to the master machine 1a.

In this invention, among the game programs that are stored in the cartridge 16, a mini game that is accompanied with a main game may be adopted as a game to be executed through the communication play. For example, in a roll playing game (RPG) or an action RPG, a game where a player's character matches with an enemy character while moving on a field map and clears a predetermined mission is adopted as a main game and a game where the game does not have much effect on a game status of the main game or on a story development, such as the player's character matches with a specific enemy character or a slot game or a card game is played, is adopted as a mini game.

The communication play may be a cooperation play or a match play. The cooperation play is a play in which the player's characters of the master machine 1a and the slave machine 1b become friends and cooperate with each other to match with the enemy characters controlled by the CPU core 21. The match play is a play in which the player's characters of the master machine 1a and the slave machine 1b are divided into friends and enemies and match with each other. In the match play, matches such as a one-to-two match and a one-to-three match may be performed as well as a one-to-one match, a two-to-two match, and the like. However, when an unskilled player who does not have game software matches with a skilled player who has the game software, the skilled player may easily win the game and the unskilled player who does not have the game software may be rarely interested in the game. In the case of the cooperation play, the skilled player who is used to playing can implement the game while assisting the unskilled player who is not used to playing. Therefore, the unskilled player may be sufficiently interested in the game.

After the communication play ends, if the player of the slave machine 1b purchases the cartridge 16 and mounts the cartridge 16 to the slave machine 1b as illustrated in FIG. 3C and the master machine 1a and the slave machine 1b perform communication, the item 40 that has been deposited to the master machine 1a is delivered to the slave machine 1b. Even after communication with the master machine 1a ends, the slave machine 1b can use the item 40 in the main game.

Figure 4:
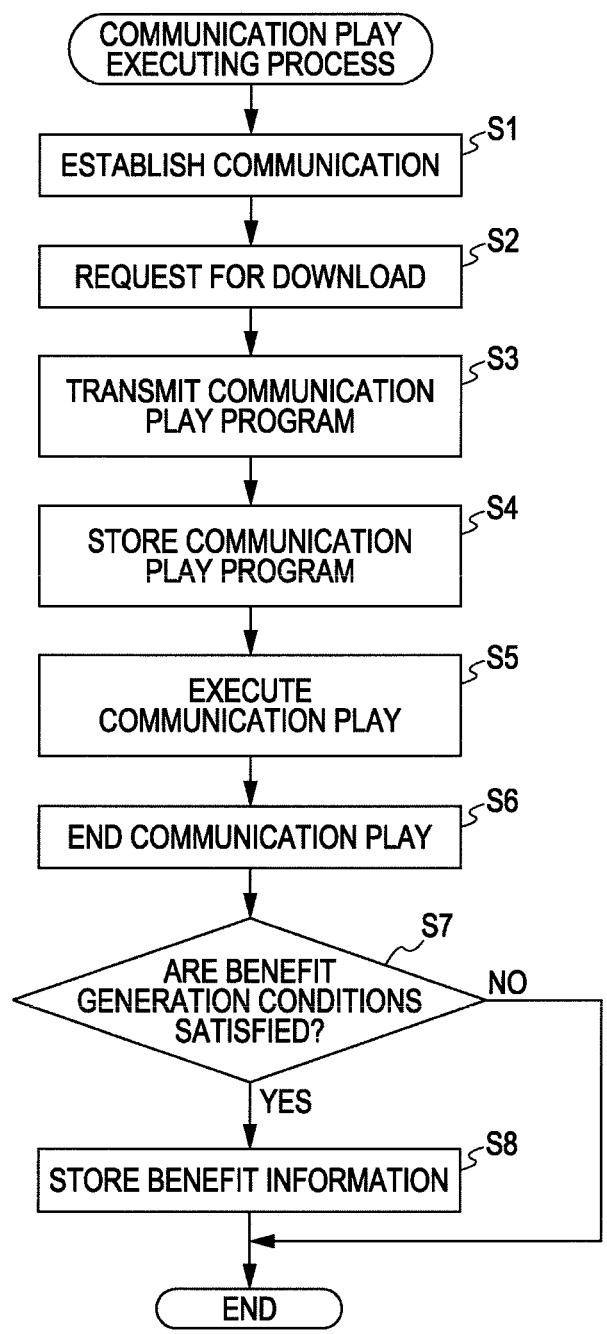
FIG. 4 is a flowchart illustrating an example of a communication play executing process in the game system according to the embodiment of the present invention.

Next, a communication play executing process of when the master machine 1a and the slave machine 1b execute the communication play will be described. FIG. 4 is a flowchart illustrating an example of the communication play executing process in the game system according to the embodiment of the present invention. First, the master machine 1a and the slave machine 1b transmit and receive unique identification information (for example, identification information such as a MAC address) of the game apparatus with respect to each other and the communication is established in step S1. The player can display the name of the communication play program to be downloaded by the communication on the first display 11, by operating the slave machine 1b. The player of the slave machine 1b can select the communication play program which the player desires to download, from the communication play programs displayed on the first display 11, and can request the master machine 1a to download the communication play program in step S2. If the download request is received by the master machine 1a, the communication play program is transmitted from the master machine 1a to the slave machine 1b in step S3. In the slave machine 1b, the communication play program is temporarily stored in the WRAM 22 in step S4.

Next, the communication play is executed in the master machine 1a and the slave machine 1b in step S5. The slave machine 1b performs the communication play based on the mini game with the master machine 1a, using the communication play program downloaded in step S4. In the communication play, the player who operates the master machine 1a and the player who operates the slave machine 1b operate the player's characters, cooperate with each other, and match with the enemy characters controlled by the CPU core 21.

The conditions of when the game is implemented in the communication play depend on the settings of the normal play (setting of when the game is played by one player, not the communication play), in the master machine 1a. For example, the items that can be used when the normal play is performed in the master machine 1a can be used as the player's character of the slave machine 1b in the communication play.

After the communication play is performed and any either the player's character or the non-player's character satisfies the predetermined victory conditions (for example, strength value of either the player's character becomes zero), the communication play ends in step S6. When the communication play ends, the CPU core 21 of the master machine 1a determines whether or not the predetermined conditions to generate a benefit are found in step S7. The conditions to generate the benefit may be appropriately changed according to the strength or the level of the character operated by the player, the characters of the friends or the characters of the enemies or a situation of when the communication play ends. If the player wins the communication play, the benefit may be generated without question.

In step S7, when it is determined that the benefit is generated, a MAC address of the slave machine 1b and benefit information to specify the generated benefit are associated with each other and are stored in a benefit information table set to the RAM 16a of the cartridge 16 mounted to the master machine 1a in step S8. When it is determined that the benefit is not generated, the communication play simply ends. When the communication play ends, the communication play program that is temporarily stored in the WRAM 22 of the slave machine 1b is erased.

Figure 5:
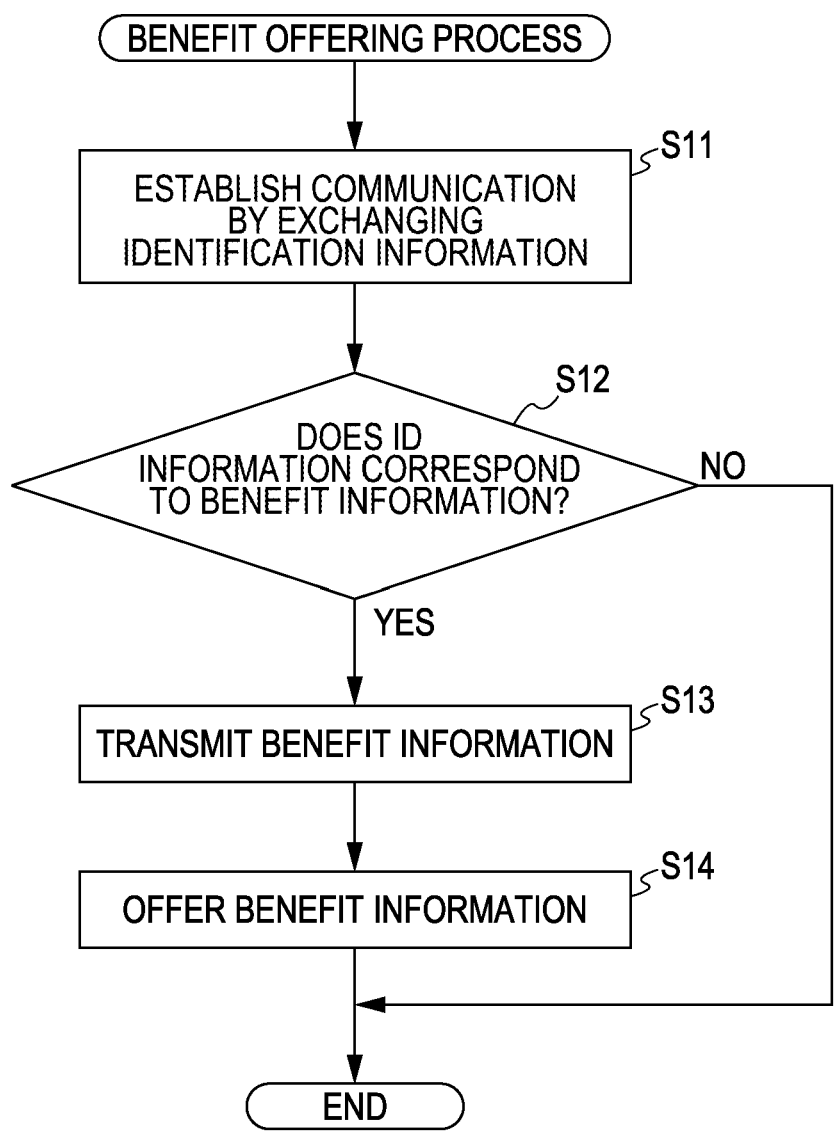
FIG. 5 is a flowchart illustrating an example of a benefit offering process in the game system according to the embodiment of the present invention.

After the communication play ends, if the cartridge 16 is mounted to the slave machine 1b and the main game of the game can be played, the slave machine 1b can obtain the benefit obtained when the communication play was executed in the past, by performing communication with the master machine 1a again. Next, a benefit offering process in the slave machine 1b will be described. FIG. 5 is an example of a flowchart of the benefit offering process in the game system according to the embodiment of the present invention.

First, the master machine 1a and the slave machine 1b transmit and receive the MAC addresses of the game apparatuses with respect to each other and the communication is established in step S11. In the master machine 1a, it is determined whether the received MAC address of the slave machine 1b matches the MAC address, which corresponds to the non-transmitted the benefit information, by referring to the benefit information table in step S12. When the MAC address of the slave machine 1b is not stored in the benefit information table, the benefit information is not offered and a series of processes ends. When the MAC address of the slave machine 1b is the MAC address not transmitted by the benefit information (YES in step S12), the benefit information that is stored in the benefit information table and that corresponds to the MAC address of the slave machine 1b is transmitted to the slave machine 1b in step S13. At the same time, in the master machine 1a, the MAC address that is transmitted to the slave machine 1b and the benefit information that is associated with the MAC address and that is stored with the MAC address are erased from the benefit information table. In the slave machine 1b that receives the benefit information, the benefit according to the received benefit information is offered to the player's character in step S14.

In this case, the benefit may be virtual currency or an item that can be used when the game is implemented or may be an experience point in which the capability or the level of the player's character can be improved, if the experience point reaches a constant value or more. As an example of the item that is offered as the benefit, a "treasure map" is used. The "treasure map" is a map that displays some parts of a field map that the player's character can have an adventure. If the player has the map, the item that can be obtained by the player's character may be displayed on the second display 12 or the player's character may arrive and an object (hereinafter, referred to as an event object) such as a "castle" or a "cave" where a new map (hereinafter, referred to as an event map) is spread may be displayed on the second display 12. If the player's character arrives at the event object, the player's character can have an adventure over a newly spread event map. In the event map, items that are difficult to obtain on the field map can be found.

Next, the configuration of the benefit information table when the "treasure map" is offered as the benefit will be described. FIG. 6 is a diagram illustrating the benefit information table according to the embodiment of the present invention. In a benefit information table 30, a possessor name 32, a field map ID 33, an event map ID 34, an enemy character ID 35, and an item ID 36 are stored in association with the MAC address 31 of the slave machine 1b.

The MAC address 31 is a unique ID that is allocated to a network apparatus (wireless communication device 29) and is different for each game apparatus 1. Therefore, it can be determined whether the game apparatus is the game apparatus 1 which performs the communication play in the past, using the MAC address 31. The possessor name 32 indicates the original possessor of the benefit. As the possessor name 32, a registration name where the player of the slave machine 1b who obtained the benefit was registered is stored. However, when the communication play is performed in the plural slave machines 1b, the registration names of the players of all of the slave machines 1b may be stored as the possessor names 32. The name of the "treasure map" is determined by the possessor name 32. When the possessor name 32 is "SAKAMOTO RYOMA", the name of the treasure map" becomes a "map of ○○ of SAKAMOTO RYOMA". When the possessor names 32 are "SAKAMOTO RYOMA" and "KATSU KAISHU", the name of the "treasure map" becomes a "map of ○○ of SAKAMOTO RYOMA and KATSU KAISHU".

The field map ID 33 is an ID to specify display data of the "treasure map" that displays some parts of the field map over which the player's character may have experience. On the "treasure map" that displays the parts, the position of the event object is displayed. The player can move the player's character on the field map while confirming the "treasure map" and moves the player's character to the event object. The event map ID 34 is an ID to specify map data of a newly spread event map, when the player's character arrives at the event object. A shape or design of the map is previously set for each map data.

The enemy character ID 35 is an ID to specify the enemy character appearing on the event map. Because plural kinds of enemy characters may appear on the event map, the enemy character ID 35 may be an ID to specify the kind of the enemy character that may appear. The item ID 36 is an ID to specify the item that can be obtained by the player's character on the event map. According to the situation of the victory at the time of the communication play or the level of the friend or the counterpart, the benefit information may be specified.

The field map data, the event map data, the enemy data, or the item data that corresponds to the field map ID 33, the event map ID 34, the enemy character ID 35, or the item ID 36 is previously stored in the ROM 16a that stores the game program.

Figure 7A:
FIGS. 7A to 7F are diagrams illustrating a display screen of the game apparatus according to the embodiment of the present invention.

Next, display contents of the first display 11 when the benefit is offered after the communication play ends will be described. In this case, the case where the name of the player of the master machine 1a is "KATSU KAISHU" and the name of the player of the slave machine 1b is "SAKAMOTO RYOMA" will be described. FIG. 7A is a diagram illustrating the first display 11 of the master machine 1a when the communication play ends. In FIG. 7A, the treasure map is displayed on the first display 11 and "SAKAMOTO RYOMA discovers a map of the angry earth at the time of a ship battle" is displayed. As illustrated in FIG. 7C, on the first display 11 of the master machine 1a, information indicating that the "map of the angry earth of SAKAMOTO RYOMA" that is obtained by the slave machine 1b is deposited to the master machine 1a is displayed.

Figure 7B:
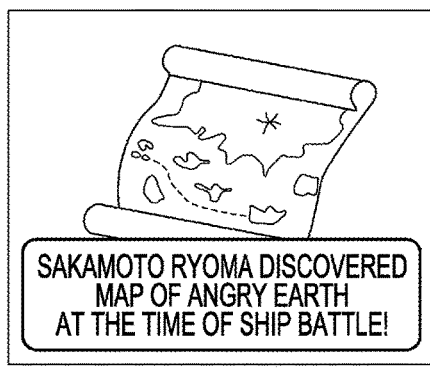
Figure 7C:
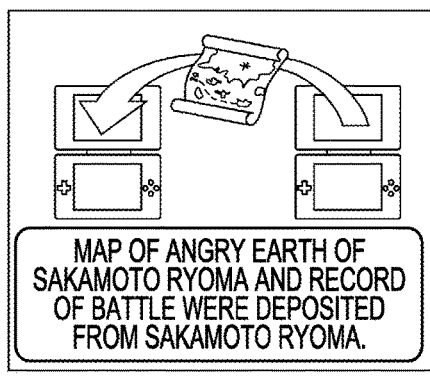
Figure 7D:
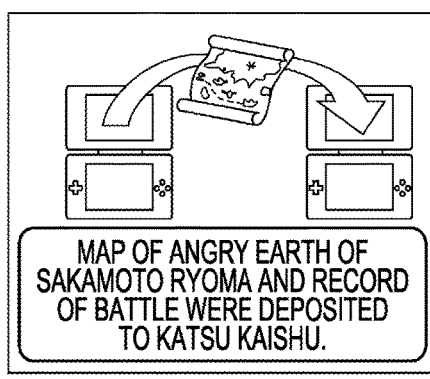

Meanwhile, FIG. 7B is a diagram illustrating the first display 11 of the slave machine 1b when the communication play ends. In FIG. 7B, the treasure map is displayed on the first display 11 and the same message as the master machine 1a of FIG. 7A is displayed. As illustrated in FIG. 7D, on the first display 11 of the slave machine 1b, information indicating that the "map of the angry earth of SAKAMOTO RYOMA" that is obtained by the slave machine 1b is deposited to the master machine 1a is displayed.

Figure 7E:
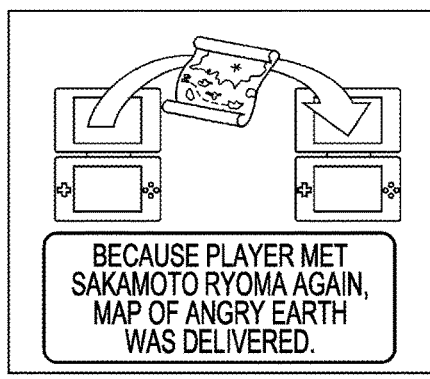
Figure 7F:
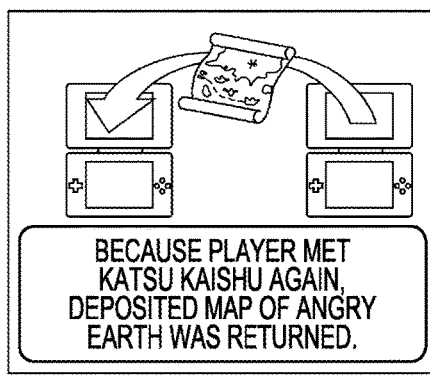

As described above, after the communication play ends, if the slave machine 1b mounts the cartridge and performs the communication play with the master machine 1a again, the "treasure map" is returned from the master machine 1a to the slave machine 1b. FIG. 7E illustrates the case where information indicating that "map of the angry earth of SAKAMOTO RYOMA" is delivered from the master machine 1a to the slave machine 1b is displayed on the first display 11 of the master machine 1a. FIG. 7F illustrates the case where information indicating that "map of the angry earth of SAKAMOTO RYOMA" is returned from the master machine 1a to the slave machine 1b is displayed on the first display 11 of the slave machine 1b.

After the "treasure map" is returned from the master machine 1a to the slave machine 1b, the player of the slave machine 1b can execute the game by oneself. The player can confirm the contents of the "treasure map" that is returned from the master machine 1a. If the player's character moves to the zone displayed on the "treasure map" while moving on the field map, the player can confirm the event object such as the "castle" or the "cave" which could not have been confirmed until the player possesses the "treasure map", on the field map. If the player's character arrives at the event object, the event map is newly spread and the player can have a new experience using the event map.

In the embodiment described above, the example of the communication play between the master machine 1a and the slave machine 1b has been described. However, the present invention can be applied to a game system that includes a portable game apparatus and a game server capable of performing communication with the portable game apparatus through an access point. First, the game program is downloaded from the game server to the WRAM 22 of the portable game apparatus through the access point. The player performs a trial play of the game based on the downloaded game program. The downloaded game program is a part of the game programs that are stored in a purchased game cartridge. If the trial play of the game ends, the portable game apparatus can obtain the benefit such as an item, according to the result of the game. However, because the game program downloaded to the portable game apparatus is erased from the WRAM 22, the MAC address of the portable game apparatus and the benefit information are associated and are stored in the game server and the item is stored in the game server.

After the trial play of the game ends, if the player purchases the game cartridge, mounts the game cartridge to the portable game apparatus, and performs communication with the game server, the benefit information is transmitted from the game server to the portable game apparatus and the stored item is delivered to the portable game apparatus. As such, according to the present invention, after the player performs the trial play, if the player purchases the game software and performs communication with the game server again, the benefit that was obtained when the trial play was performed can be obtained. Therefore, it is strongly motivated to purchase game software.

EXPLANATIONS OF REFERENCE NUMERALS 1 game apparatus
11 first display
12 second display
13 touch panel
14 operation part
15 speaker
16 cartridge
17 housing
21 CPU core
22 WRAM
23 first VRAM
24 first GPU
25 second VRAM
26 second GPU
27 I/F circuit
28 connector
29 wireless communication device
30 benefit information table
40 item

What is claimed is:

1. A game apparatus that performs a first communication and a second communication with another game apparatus, the second communication being established after the first communication ends, the game apparatus comprising:
a memory that stores a game program including a communication play program to perform a communication play with the another game apparatus;
a transmitter that transmits the communication play program stored in the memory to the another game apparatus, which does not have a game storage medium that contains the game program when the first communication is established;
a receiver that receives identification information from the another game apparatus to specify the another game apparatus in the first communication; and
a processor that performs a game in the first communication, according to the communication play program,
wherein the memory associates benefit information that offers a benefit during performing the game in the another game apparatus with the identification information of the another game apparatus received by the receiver and stores the benefit information in association with the identification information, according to a performance result of the game by the processor, before the first communication ends,
the receiver receives the identification information from the another game apparatus, when the second communication with the another game apparatus is established when the another game apparatus has the game storage medium that contains the game program, after the communication play of the first communication ends,
the transmitter transmits data related to the benefit information, which is stored in the memory and is associated with the identification information received by the receiver, to the another game apparatus in the second communication, the benefit in the transmitted benefit information being used during performing the game in the second communication,
after the first communication ends and before the second communication starts, the another game apparatus obtains the game storage medium containing the game program,
the game apparatus determines whether or not non-transmitted benefit information is contained in the benefit information stored in the memory, the benefit information is stored according to the performance result of the game in the first communication between the game apparatus and the another game apparatus, the benefit offered by the benefit information is one of a virtual currency, an item, experience points, an event map, and an event object, and the transmitter transmits data related to the non-transmitted benefit information in the second communication when it is determined that the non-transmitted benefit information is contained in the benefit information stored in the memory, and when the data related to the non-transmitted benefit information is transmitted, the non-transmitted benefit information is erased from the memory.

2. A tangible non-transitory computer readable medium that stores a game program that comprises a communication play program to perform a communication play between a computer device and a game apparatus and to execute a game in the computer device, the game program causing the computer device to function as:
- a transmitter that transmits the communication play program to the game apparatus, which does not have a game storage medium that contains the game program when a first communication is established between the computer device and the game apparatus;
- a receiver that receives identification information from the game apparatus to specify the game apparatus, in the first communication;
- a processor that performs the game in the first communication, according to the communication play program; and
- a memory that associates benefit information that offers a benefit used during performing the game in the game apparatus with the identification information of the game apparatus received by the receiver and stores the benefit information in association with the identification information, according to a performance result of the game performed by the processor, before the first communication ends,
- wherein the receiver receives the identification information from the game apparatus, when a second communication with the game apparatus is established when the game apparatus has the game storage medium that contains the game program, after the communication play of the first communication ends,
- the transmitter transmits data related to the benefit information, which is stored in the memory and is associated with the identification information received by the receiver, to the game apparatus in the second communication, the benefit in the transmitted benefit information being used during performing the game in the second communication,
- after the first communication ends and before the second communication starts, the another game apparatus obtains the game storage medium containing the game program,
- the game apparatus determines whether or not non-transmitted benefit information is contained in the benefit information stored in the memory, the benefit information is stored according to the performance result of the game in the first communication between the game apparatus and the another game apparatus, the benefit offered by the benefit information is one of a virtual currency, an item, experience points, an event map, and an event object, and the transmitter transmits data related to the non-transmitted benefit information in the second communication when it is determined that the non-transmitted benefit information is contained in the benefit information stored in the memory, and
- when the data related to the non-transmitted benefit information is transmitted, the non-transmitted benefit information is erased from the memory.

3. A game apparatus that performs a first communication and a second communication with another game apparatus, the second communication being established after the first communication ends, the game apparatus comprising:
- a transmitter that transmits identification information of the game apparatus to the another game apparatus, in the first communication when the game apparatus does not have a game storage medium containing a communication play program;
- a receiver that receives the communication play program from the another game apparatus to perform a communication play with the another game apparatus, in the first communication;
- a memory that temporarily stores the communication play program received by the receiver until the communication play of the first communication with the another game apparatus ends; and
- a processor that performs the communication play in the first communication, according to the communication play program stored in the memory,
- wherein the transmitter transmits the identification information to the another game apparatus, when the second communication with the another game apparatus is established when the game apparatus has the game storage medium that contains the communication play program, after the communication play of the first communication ends,
- the receiver receives benefit information from the another game apparatus that offers a benefit during performing a game in the second communication,
- the processor offers the benefit during performing the game in the game apparatus, according to the benefit information received by the receiver, when the game apparatus includes the game storage medium in the second communication,
- after the first communication ends and before the second communication starts, the game apparatus obtains the game storage medium containing the communication play program,
- the another game apparatus determines whether or not non-transmitted benefit information is contained in the benefit information stored in the another game apparatus, the benefit information is stored according to a performance result of the game in the first communication between the game apparatus and the another game apparatus, the benefit offered by the benefit information is one of a virtual currency, an item, experience points, an event map, and an event object, and transmits the non-transmitted benefit information in the second communication when it is determined that the non-transmitted benefit information is contained in the benefit information stored in the another game apparatus, and
- when the non-transmitted benefit information is transmitted, the non-transmitted benefit information is erased from the another game apparatus.

4. A game system that comprises a portable game apparatus and a game server performing a first communication and a second communication with the portable game apparatus through an access point, the second communication being established after the first communication ends,
- wherein the game server comprises
  - a server memory that stores a game program to play a game in the portable game apparatus,
  - a server transmitter that transmits the game program stored in the server memory to the portable game apparatus, which does not have a game storage medium that contains the game program when the first communication is established,
  - a server receiver that receives identification information from the portable game apparatus to specify the portable game apparatus in the first communication, the server receiver receives a performance result of the game by the portable game apparatus in the first communication, the server memory associates benefit information that offers a benefit used during performing the game in the portable game apparatus with the identification information of the portable game apparatus received by the server receiver and stores the benefit information in association with the identification information, according to the performance result of the game received by the server receiver, before the first communication ends, the server receiver receives the identification information from the portable game apparatus, when the second communication with the portable game apparatus is established when the portable game apparatus has the game storage medium that contains the game program, after the first communication with the portable game apparatus ends, and the server transmitter transmits data related to the benefit information, which is stored in the server memory and is associated with the identification information received by the server receiver, to the portable game apparatus, in the second communication, and wherein the portable game apparatus comprises an apparatus transmitter that transmits the identification information of the portable game apparatus to the game server in the first communication, an apparatus receiver that receives the game program from the game server in the first communication, an apparatus memory that temporarily stores the game program received by the apparatus receiver until the first communication with the game server ends, an apparatus processor that performs the game in the first communication, according to the game program stored in the apparatus memory, the apparatus transmitter transmits the identification information to the game server, when the second communication with the game server is established after the first communication with the game server ends, the apparatus receiver receives the data related to the benefit information from the game server in the second communication, and the apparatus processor offers a benefit during performing the game in the portable game apparatus, according to the data related to the benefit information received by the apparatus receiver, when the portable game apparatus includes the game storage medium in the second communication, wherein after the first communication ends and before the second communication starts, the portable game apparatus obtains the game storage medium containing the game program, the game server determines whether or not non-transmitted benefit information is contained in the benefit information stored in the server memory, the benefit information is stored according to the performance result of the game in the first communication between the game apparatus and the another game apparatus, the benefit offered by the benefit information is one of a virtual currency, an item, experience points, an event map, and an event object, and the server transmitter transmits data related to the non-transmitted benefit information in the second communication when it is determined that the non-transmitted benefit information is contained in the benefit information stored in the server memory, and when the data related to the non-transmitted benefit information is transmitted, the non-transmitted benefit information is erased from the server memory.

5. A non-transitory computer readable medium that stores a game program performing a first communication and a second communication between a game server and a portable game apparatus through an access point, the second communication being established after the first communication ends, the game program causing a computer device to function as the game server or the portable game apparatus, wherein the game server comprises a server memory that stores a game program to play a game in the portable game apparatus, a server transmitter that transmits the game program stored in the server memory to the portable game apparatus, which does not have a game storage medium that contains the game program when the first communication is established, a server receiver that receives identification information from the portable game apparatus to specify the portable game apparatus in the first communication, the server receiver receives a performance result of the game by the portable game apparatus in the first communication, the server memory associates benefit information that offers a benefit during performing the game in the portable game apparatus with the identification information of the portable game apparatus received by the server receiver and stores the benefit information in association with the identification information, according to the performance result of the game received by the server receiver before the first communication ends, the server receiver receives the identification information from the portable game apparatus, when the second communication with the portable game apparatus is established, when the portable game apparatus has the game storage medium that contains the game program, after the first communication with the portable game apparatus ends, and the server transmitter transmits data related to the benefit information, which is stored in the server and is associated with the identification information received by the server receiver, to the portable game apparatus, in the second communication, and wherein the portable game apparatus comprises an apparatus transmitter that transmits the identification information of the portable game apparatus to the game server in the first communication, an apparatus receiver that receives the game program from the game server in the first communication, an apparatus memory that temporarily stores the game program received by the apparatus receiver until the first communication with the game server ends, an apparatus processor that performs the game in the first communication, according to the game program stored in the apparatus memory, the apparatus transmitter transmits the identification information to the game server, when the second communication with the game server is established after the first communication with the game server ends, the apparatus receiver receives the data related to the benefit information from the game server in the second communication, and the apparatus processor offers a benefit during performing the game in the portable game apparatus, according to the data related to the benefit information received by the apparatus receiver, when the portable game apparatus comprises the game storage medium in the second communication, wherein after the first communication ends and before the second communication starts, the portable game apparatus obtains the game storage medium containing the game program, the game server determines whether or not non-transmitted benefit information is contained in the benefit information stored in the server memory, the benefit information is stored according to the performance result of the game in the first communication between the game apparatus and the another game apparatus, the benefit offered by the benefit information is one of a virtual currency, an item, experience points, an event map, and an event object, and the server transmitter transmits data related to the non-transmitted benefit information in the second communication when it is determined that the non-transmitted benefit information is contained in the benefit information stored in the server memory, and when the data related to the non-transmitted benefit information is transmitted, the non-transmitted benefit information is erased from the server memory.

6. The game apparatus according to claim 3, wherein, when the first communication ends, the game program stored in the memory is erased.

7. The game system according to claim 4, wherein, when the first communication ends, the game program stored in the apparatus memory is erased.

8. The game apparatus according to claim 1, wherein the game storage medium is a cartridge.

9. The tangible non-transitory computer readable medium according to claim 2, wherein the game storage medium is a cartridge.

10. The game apparatus according to claim 3, wherein the game storage medium is a cartridge.

11. The game system according to claim 4, wherein the game storage medium is a cartridge.

12. The game apparatus according to claim 1, wherein the memory stores identification data of the benefit, and the transmitter transmits data indicating that the another game apparatus has the benefit identified by the identification data, as the data related to the benefit information.

13. The tangible non-transitory computer readable medium according to claim 2, wherein the memory stores identification data of the benefit, and the transmitter transmits data indicating that the game apparatus has the benefit identified by the identification data, as the data related to the benefit information.

14. The game system according to claim 4, wherein the server memory stores identification data of the benefit, the server transmitter transmits data indicating that the portable game apparatus has the benefit identified by the identification data, as the data related to the benefit information, and the apparatus receiver receives the data indicating that the portable game apparatus has the benefit identified by the identification data.

15. The non-transitory computer readable medium according to claim 5, wherein the server memory stores identification data of the benefit, the server transmitter transmits data indicating that the portable game apparatus has the benefit identified by the identification data, as the data related to the benefit information, and the apparatus receiver receives the data indicating that the portable game apparatus has the benefit identified by the identification data.

16. The game apparatus according to claim 1, wherein the memory stores identification data of the benefit, and the transmitter transmits an image of the benefit identified by the identification data, as the data related to the benefit information.

17. The tangible non-transitory computer readable medium according to claim 2, wherein the memory stores identification data of the benefit, and the transmitter transmits an image of the benefit identified by the identification data, as the data related to the benefit information.

18. The game system according to claim 4, wherein the server memory stores identification data of the benefit, the server transmitter transmits an image of the benefit identified by the identification data, as the data related to the benefit information, and the apparatus receiver receives the image of the benefit identified by the identification data.

19. The non-transitory computer readable medium according to claim 5, wherein the server memory stores identification data of the benefit, the server transmitter transmits an image of the benefit identified by the identification data, as the data related to the benefit information, and the apparatus receiver receives the image of the benefit identified by the identification data.

20. The game apparatus according to claim 1, wherein the game apparatus is a game server, and the another game apparatus is a client game apparatus.

* * * * *